(12) United States Patent
Tucker

(10) Patent No.: US 10,016,698 B2
(45) Date of Patent: Jul. 10, 2018

(54) POLYMER SOLUTION CONCENTRATOR MACHINE AND DEVOLATILIZATION PROCESS

(71) Applicant: NFM WELDING ENGINEERS, INC., Massillon, OH (US)

(72) Inventor: Christopher S. Tucker, Canton, OH (US)

(73) Assignee: NFM Welding Engineers, Inc., Massillon, OH (US)

( * ) Notice: Subject to any disclaimer, the term of this patent is extended or adjusted under 35 U.S.C. 154(b) by 245 days.

(21) Appl. No.: 14/789,040

(22) Filed: Jul. 1, 2015

(65) Prior Publication Data

US 2016/0001195 A1 Jan. 7, 2016

Related U.S. Application Data

(60) Provisional application No. 62/019,932, filed on Jul. 2, 2014.

(51) Int. Cl.
*C08F 6/10* (2006.01)
*B01D 1/22* (2006.01)

(52) U.S. Cl.
CPC ............... *B01D 1/226* (2013.01); *C08F 6/10* (2013.01)

(58) Field of Classification Search
CPC .................. B01D 1/226; C08F 6/10
See application file for complete search history.

(56) References Cited

U.S. PATENT DOCUMENTS

| | | |
|---|---|---|
| 3,244,688 A | 4/1966 | Goins |
| 3,586,089 A | 6/1971 | Mato et al. |
| 3,738,409 A | 6/1973 | Skidmore |
| 3,963,558 A | 6/1976 | Skidmore |
| 4,047,705 A | 9/1977 | Hanslik |
| 4,407,989 A | 10/1983 | Takao et al. |
| 4,686,279 A | 8/1987 | Nagtzaam et al. |
| 5,502,154 A | 3/1996 | Iwasyk |
| 5,506,336 A | 4/1996 | Iwasyk |

FOREIGN PATENT DOCUMENTS

EP 2328937 B1 12/2013

OTHER PUBLICATIONS

Giles et al. Extrusion: The Definitive Processing Guide and Handbook 2005.*
"Comparison of Devolatilization Technologies for Viscous Polymers"; Dr. Pierre-Alain Fleury, Dr. Daniel Witte, Helmut Schildknecht List Group; ANTEC 2005; pp. 243-248.
"An Extruder Made to Measure"; What Affects the World; Technology Solutions 2013; pp. 30-33.
"Kneader Technology for the Direct Devolatilization of Temperature Sensitive Elastomers"; Boyd T. Safrit, PhD, PE, Andreas E. Diener, Dipl. Ing.; ANTEC 2008.

* cited by examiner

*Primary Examiner* — Mark S Kaucher
(74) *Attorney, Agent, or Firm* — Dureska & Moore, LLC; David J. Danko

(57) ABSTRACT

An improved polymer solution concentrator and accompanying devolatilization process enable concentration of polymer solutions to higher concentrations and viscosities than prior art equipment, overcome the viscosity limits and metering difficulties of the prior art, reduce the overall size of the devolatilization system, and reduce the energy, resources and cost required to finish polymer formulations. The concentrator replaces a conventional flash tank and includes a generally solid conically-shaped twin barrel. A pair of counter-rotating intermeshing screws is disposed in the barrel, and includes a portion with a vapor removal geometry and a portion with a positive displacement geometry. A vapor discharge port is formed in the barrel, and upon rotation of the screws in the barrel, a polymer formulation is concentrated from a value below about 40 weight percent to a value of up to about 98 weight percent.

19 Claims, 4 Drawing Sheets

POLYMER SOLUTION CONCENTRATOR MACHINE AND DEVOLATILIZATION PROCESS

CROSS-REFERENCE TO RELATED APPLICATION

This application claims the benefit of U.S. Provisional Patent Application Ser. No. 62/019,932, which was filed on Jul. 2, 2014.

BACKGROUND OF THE INVENTION

Technical Field

The invention relates to the removal of solvents from polymer formulations. More particularly, the invention relates to devolatilization systems that are used to finish formulations of certain polymers. Even more particularly, the invention is directed to an improved polymer solution concentrator machine and accompanying devolatilization process which enable concentration of polymer solutions to higher concentrations and viscosities than conventional equipment, overcome the viscosity limits and metering difficulties of the prior art, reduce the overall size of the devolatilization system when compared to the prior art, and reduce the energy, resources and cost required to finish polymer formulations.

Background Art

Reference herein shall be made to the terms polymer and polymer formulation with the understanding that such terms include polymers and polymer formulations as known to those skilled in the art, elastomers and elastomer formulations as known to those skilled in the art, and combinations thereof. In the formulation or production of certain polymers, the polymers synthesized are polymerized in a dilute solution of solvent, typically between 5 and 40 weight percent (wt %) polymer to solvent. After polymerization, in order for the polymer products to be prepared for further use, the solvents used during formulation must be substantially removed. Usually, a finished polymer with about 0.03 percent (%) solvent by weight or less is desired. The removal of solvent is often performed by a devolatilization process, which will be described below.

In the art, the devolatilization or removal of formulating solvents from polymer formulations is generally achieved through a two-part process. The first part or step of the process is an initial devolatilizing step. For certain materials, such as thermoplastic rubber (TPR), the polymer formulation is fed into a flash tank, in which solvent vapor separates from the polymer formulation based on the heat of the solution. For other materials, such as elastomer-based formulations, steam stripping is employed, in which large quantities of steam are employed to strip or drive off the solvent in a series of strippers or tanks, to create a water slurry. The second part or step is to isolate the polymer from the remaining solution or water slurry using an extrusion process.

When steam stripping is employed in the initial step of solvent removal, the polymer formulation is transferred from a reaction vessel by a series of pumps to a series of strippers or tanks. Steam is employed in the tanks to drive off the solvent, creating a water slurry. The water slurry is fed to an extruder to isolate the polymer from the remaining solution. The steam stripping process is the most widely used process in the prior art for isolating solution polymer from the solvent. It has the significant drawbacks of using very high energy consumption to generate the steam that is required for the process, and of generating significant undesirable emission levels. Because of these drawbacks, industry has long sought to remove the solvent without the use of steam. It has been predicted that energy savings in a range of about 60% are possible for a process that does not create a water slurry to finish the polymer.

When a flash tank is employed in the initial step of solvent removal, the process is often referred to in the art as a direct devolatilization process. In the direct devolatilization process, the polymer formulation is transferred from a reaction vessel by a series of pumps through a pre-heater element. The pre-heater elevates the formulation temperature, increasing the vapor pressure of the solvents in preparation for the initial removal of solvents. The formulation is then transferred into to the top of a flash tank, where it is gravity fed into the heat-controlled tank interior. The reduction in pressure from the super-heated solution to the lower flash tank pressure causes the solvent to vaporize and separate from the polymer solution, as is known in the art. The resulting vapor is vented out of the flash tank through a vapor takeoff located on the top of the tank. The remaining concentrated formulation collects at the bottom of the flash tank. More particularly, due to the flashing of solvent from the dilute formulation in the flash tank, the remaining formulation which collects at the bottom of the flash tank is more concentrated than when entering the tank.

The concentrated formulation that collects at the bottom of the flash tank is pumped by a gear pump to an extruder. The extruder then isolates the polymer from the solvent by evaporating the remaining solvent from the formulation as known in the art.

In conventional devolatilization processes that employ a flash tank, the initial step of solvent removal utilizing a flash tank is limited by the flash tank design. The polymer solution must flow by gravity to the discharge device at the bottom of the tank. However, concentrated polymer solutions have very high viscosity under the flash conditions desired, for example at 60-90 wt % polymer and temperatures between 60 and 120 degrees Celsius (° C.). Because the formulation flows by gravity within the flash tank, the concentration of the formulation typically must be controlled to a level which maintains a low enough viscosity of the formulation for it to properly flow down the inner wall of the vessel. If the viscosity of the formulation is too high, as is the case with an over-concentrated formulation, the polymer in the formulation can potentially adhere to the side of the vessel and turn dark in color or even cross-link in the vessel, resulting in an undesirable product.

Additionally, for gravity feeding, a level of polymer formulation must be maintained on top of the gear pump in order to provide the required net positive suction head pressure to keep the discharge device flooded. In the case of an over-concentrated formulation, this level must increase with the increasing viscosity of concentrated formulation to maintain proper function of the discharge device. As a result, the residence time of the polymer formulation in the tank must increase, which can create the potential for further over-concentrating of the formulation due to the conditions in which flashing is carried out within the tank. Furthermore, if the production line is stopped for any reason, over-concentration within the flash tank can potentially occur. Such over-concentration of the polymer formulation can result in the inability of the gear pump to function properly, which may require the over-concentrated formulation to be manually removed, resulting in lost time and lost product.

Because of the concentration limitations during flashing in the initial step of solvent removal using conventional methods, subsequent devolatilization of the polymer product by extrusion or direct evaporation is more problematic because the polymer concentration must be reduced to allow a favorable discharge performance from the flash tank. However the lower concentration causes difficulties in the extruder such as entrainment of polymer in the vapor stream of the vents, unstable conveying performance, high residual solvent levels in the product, and low output. Moreover, due to their large size, flash tanks take up a great deal of valuable space. The direct devolatilization process has not been widely adopted because of the lack of equipment to handle the solution from a low viscosity, high volume to a very high viscosity, low volume concentrated solution.

As a result, there is a need in the art for a polymer solution concentrator machine and accompanying devolatilization process which enable concentration of polymer solutions to higher concentrations and viscosities than conventional equipment, overcome the viscosity limits and metering difficulties of the prior art, reduce the overall size of the devolatilization system when compared to the prior art, and reduce the energy, resources and cost required to finish polymer formulations. The improved polymer solution concentrator machine and devolatilization process of the present invention satisfy these needs, as will be described in detail below.

BRIEF SUMMARY OF THE INVENTION

An objective of the present invention is to provide an improved polymer solution concentrator machine and devolatilization process that enable concentration of polymer or elastomer solutions to higher concentrations and viscosities than conventional equipment.

Another objective of the present invention is to provide an improved polymer solution concentrator machine and devolatilization process that overcome the viscosity limits and metering difficulties of the prior art.

Yet another objective of the present invention is to provide an improved polymer solution concentrator machine and devolatilization process that reduce the overall size of the devolatilization system when compared to the prior art.

Still another objective of the present invention is to provide an improved polymer solution concentrator machine and devolatilization process that reduce the energy, resources and cost required to finish polymer formulations.

These objectives and others are obtained by the improved concentrator machine of the present invention. In an exemplary embodiment of the invention, the concentrator machine includes a generally solid twin bore, conically-shaped barrel. A pair of conically-shaped, counter-rotating intermeshing screws is disposed in the barrel, and the screws include a portion with a vapor removal geometry and a portion with a positive displacement geometry. Drive means are coupled to the screws, and a feed port is formed in the barrel to enable a polymer formulation to be fed into the concentrator machine. A vapor discharge port is formed in the barrel, and enables removal of vapor solvent of the polymer formulation. A concentrated formulation discharge port is formed in the barrel, and upon rotation of the screws in the barrel, a polymer formulation is concentrated from a value below about 40 weight percent to a value of up to about 98 weight percent.

These objectives and others are also obtained by the improved devolatilization process of the invention. In an exemplary embodiment of the invention, a method of devolatilization includes the steps of heating a polymer formulation with a preheater, and providing a concentrator machine which includes a generally solid twin bore, conically-shaped barrel. A pair of conically-shaped, counter-rotating intermeshing screws is disposed in the barrel, and includes a portion with a vapor removal geometry and a portion with a positive displacement geometry. The screws are rotated with drive means, and the heated polymer formulation is fed into the barrel and the screws. The polymer formulation is concentrated with the concentrator machine from a value below about 40 weight percent to a value of up to about 98 weight percent.

BRIEF DESCRIPTION OF THE SEVERAL VIEWS OF THE DRAWINGS

The preferred embodiments of the invention, illustrative of the best modes in which Applicant has contemplated applying the principles of the invention, are set forth in the following description and are shown in the drawings, and are particularly and distinctly pointed out and set forth in the appended claims.

Similar numerals refer to similar parts throughout the drawings.

DETAILED DESCRIPTION OF THE INVENTION

In order to better understand the improved polymer solution concentrator machine and devolatilization process of the present invention, a discussion of prior art devolatilization machines and processes is in order. By way of example, reference herein is provided for the finishing of styrene-isoprene-styrene (SIS) block copolymers or styrene-butadiene (SB) block copolymers, which shall be referred to below as formulation A'.

Figure 1:
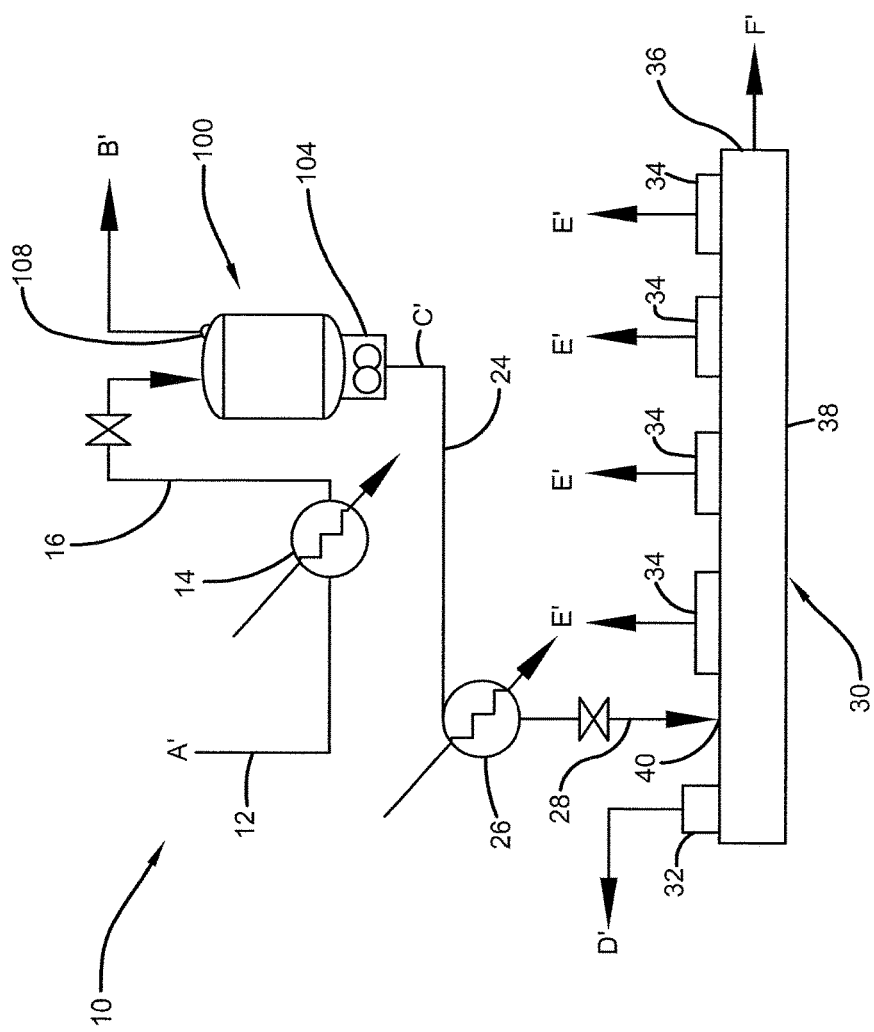
FIG. 1 is a schematic representation of a prior art devolatilization process and associated equipment.

A conventional prior art direct devolatilization process is shown in FIG. 1 and is indicated generally at 10. In conventional direct devolatilization process 10, formulation A' is transferred by a pipe or other means known in the art 12 from a formulation vessel (not shown) to a preheater 14. Preheater 14 is utilized to heat the formulation prior to the initial removal of formulating solvents. Once heated by preheater 14, formulation A' is transferred by a pipe or other means known in the art 16 to a flash tank 100.

Figure 2:
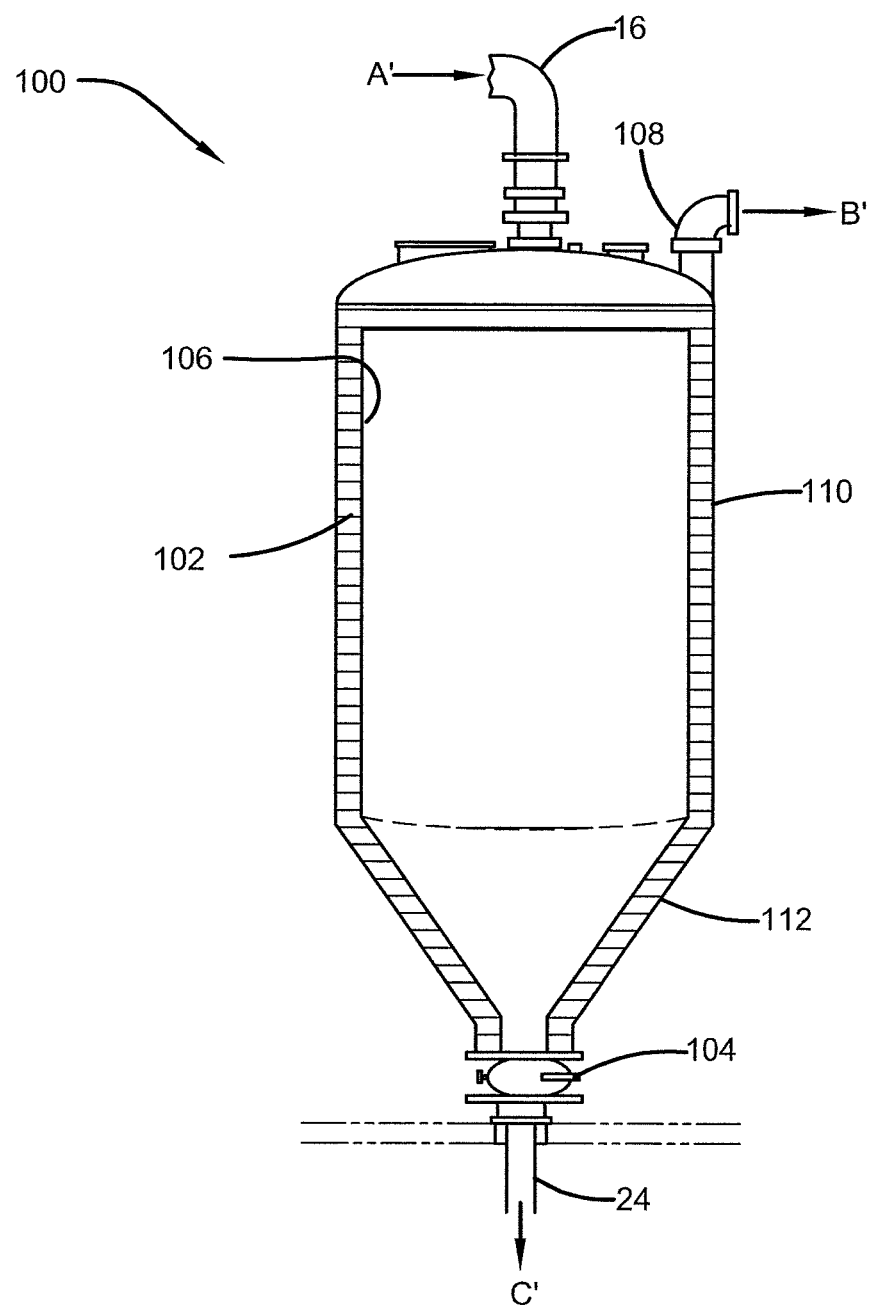
FIG. 2 is an elevational view, shown partially in cross-section, of a prior art flash tank shown in FIG. 1.

A conventional prior art flash tank is shown in FIG. 2, and is indicated generally at 100. Flash tank 100 includes a cylindrical upper or top portion 110, a conical lower or bottom portion 112, and a wall with a fluid-filled heating jacket 102, which form a flashing chamber 106. A vapor discharge vent 108 is attached to top portion 110 and is fluidly connected to flashing chamber 106. A gear pump 104 is attached to and fluidly connected to flash tank conical bottom portion 112.

The internal temperature of flash tank 100 is primarily maintained by the pressure in the tank and by the temperature of incoming formulation A', although an optional fluid filled heating jacket 102 may also be employed to help maintain a desired temperature in the tank. The internal temperature of flash tank 100 is typically set at a temperature close to that of the concentrated solution/incoming formulation A'. Upon evaporation, vapor, indicated by B', separates from the formulation and exits the flash tank from vapor discharge vent 108 located at flash tank top portion 110, leaving a concentrated formulation, indicated by C'. The means to accomplish a given separation of polymer and solvent requires adjustment of the heat input to the solution and adjustment of the pressure in flash tank 100 as is well known to those skilled in the art.

Concentrated formulation C' moves by gravity through flash chamber 106 from top portion 110 of flash tank 100 to conical bottom portion 112. Gear pump 104 discharges concentrated formulation C' accumulated at the bottom of flash tank 100 conical bottom portion 112 through a pipe or other means known in the art 24 to a second preheater 26. For gravity feeding, a level must be maintained on top of gear pump 104 in order to provide the required net positive suction head pressure to keep the discharge device flooded. This level must increase with increasing viscosity and the volume of concentrated, as is known in the art. Alternatively, a screw device (not shown), has been used in the prior art to discharge concentrated formulation C' out of the bottom of flash tank 100.

Once concentrated formulation C' is heated by preheater 26, it is transferred through a pipe or other means known in the art 28 to a finishing extruder 30, which is used to remove the remaining solvent from concentrated formulation C'. Finishing extruder 30 generally has an elongated straight barrel 38, twin screws (not shown), an initial vapor discharge port 32, a concentrated formulation entry port 40, a plurality of vapor discharge ports 34, and a devolatilized product discharge port 36. As is known in the art, the twin screws are disposed inside barrel 38, extend longitudinally through the barrel, and are connected to a drive means (not shown). Alternatively, a single screw design has been employed in the prior art. Twin-screws that are co-rotating or counter-rotating and intermeshing or non-intermeshing, or combinations of each, have been employed in prior art extruders.

With continued reference to FIG. 1, concentrated formulation C' is introduced into extruder 30 through formulation entry point 40 formed in barrel 38. The internal pressure of extruder 30 is typically controlled at a pressure lower than that of entering formulation C', such that when the formulation is introduced into the extruder, the solvent evaporates according to the pressure balance. Upon evaporation, a vapor, indicated by D', separates from the concentrated solution and exits through initial vapor discharge port 32.

As the twin-screws rotate, concentrated formulation C' is positively displaced and conveyed through barrel 38. As concentrated formulation C' is conveyed through extruder barrel 38, the twin-screws mechanically volatilize solvent from the formulation, as is well known in the art. Volatilized solvent, indicated by E', is removed from extruder 30 by vacuumed vapor discharge ports 34 located along extruder 30. In order reduce the solvent concentration to the typical desired moisture of about 0.03 percent (%) solvent by weight or less, a plurality of discharge ports 34 typically must be utilized. A final devolatilized product, indicated by F', is conveyed out of extruder 30 through discharge port 36. Alternatively, a conventional dryer, such as a single dryer or two dryers in series known in the art as LIST® dryers (LIST is a registered trademark of List Holding AG), or a steam stripping process have been used in the prior art to remove the remaining solvent from concentrated formulation C'.

As described above, conventional devolatilization process 10 utilizing flash tank 100 to initially remove solvent from the formulation of polymer products includes disadvantages. For example, flash tank 100 is limited in the concentration and viscosity of polymer solutions that it can devolatilize, encounters difficulty with metering of solutions or formulations, takes up a great deal of space, and involves significant energy, resources and cost. For example, polymer adheres to the walls of tank 100, degrades, and then eventually falls back into the product stream, which creates quality problems.

As a result, there is a need in the art for a polymer solution concentrator machine and accompanying devolatilization process which enable concentration of polymer solutions to higher concentrations and viscosities than conventional equipment, overcome the viscosity limits and metering difficulties of the prior art, reduce the overall size of the devolatilization system when compared to the prior art, and reduce the energy, resources and cost required to finish polymer formulations. The improved polymer solution concentrator machine and devolatilization process of the present invention satisfy these needs, as will now be described.

Figure 3:
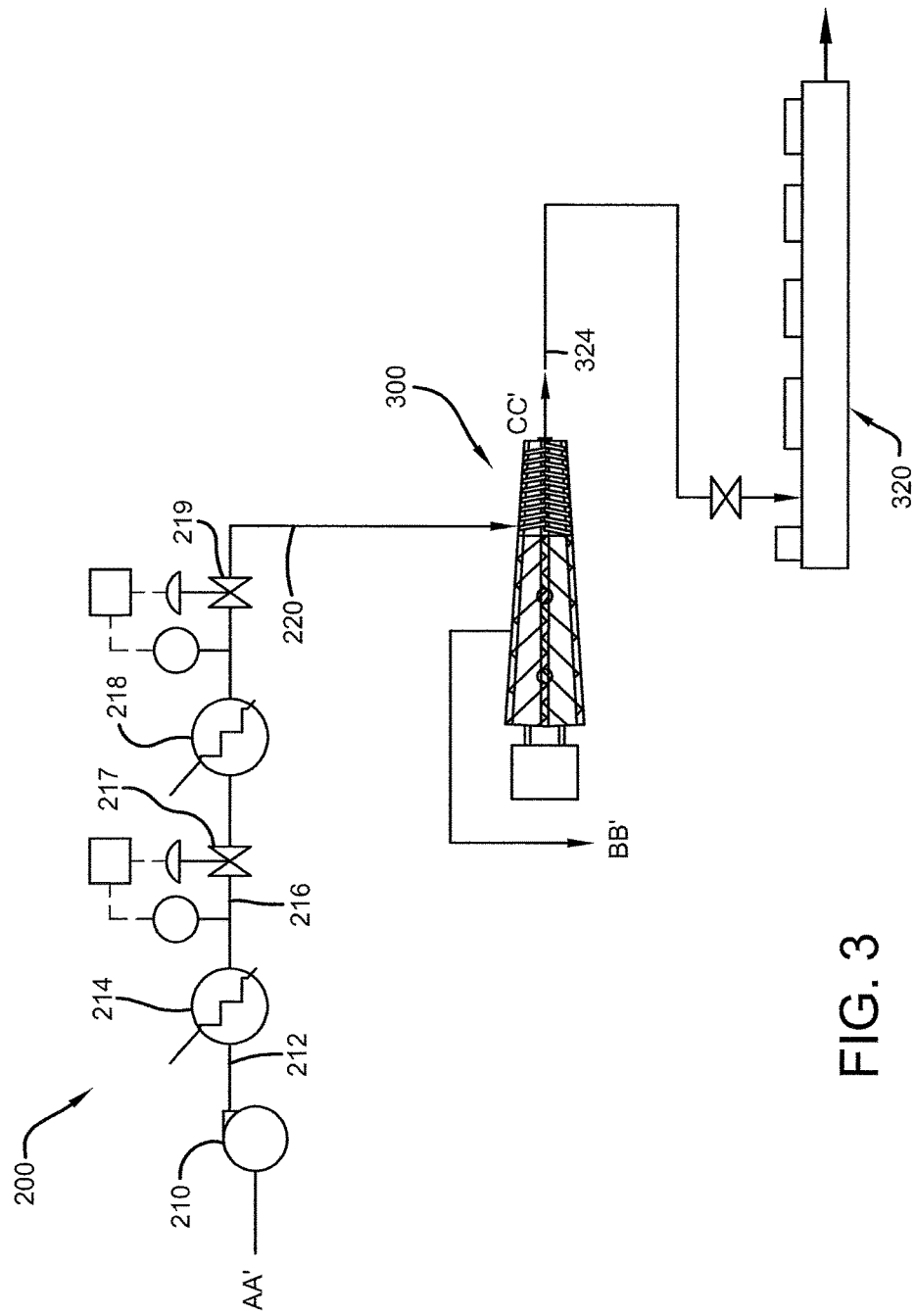
FIG. 3 is a schematic representation of a preferred embodiment of the improved polymer solution devolatilization process and concentrator machine of the present invention.

An exemplary embodiment of the improved polymer devolatilization process of the present invention is shown in FIG. 3 and is indicated generally at 200. By way of example, reference herein is provided for the finishing of butadiene rubber, which is known in the art as BR. In improved devolatilization process 200 of the present invention, a BR formulation, indicated by AA', is transferred by a pipe or other means known in the art 212 from a formulation vessel (not shown) to a first preheater 214 by a feed pump 210. Preheater 214 preferably is employed to initially heat formulation AA' prior to the initial removal of formulating solvents.

The preferred range of temperature for first preheater 214 is 130-150° C., which is primarily dictated by the degradation temperature of the polymer. The pressure of preheater 214 and thus of polymer formulation AA' is controlled using a valve 217, which reduces the solution pressure to prevent boiling of the polymer solution/polymer formulation. BR formulation AA' is then transferred by pipe or other means known in the art 216 to a second preheater 218 where additional heat is added to the formulation in a boiling condition, such that the vapor fraction of the two phase mixture increases but the temperature remains at the saturation temperature. The pressure of second preheater 218 is controlled by a valve 219 at a pressure below the saturation pressure, but at a level high enough to maintain a stable foam.

Once heated by second preheater 218, BR formulation AA' is transferred by a pipe or other feed mechanism 220 to improved polymer solution concentrator machine of the present invention, a preferred embodiment of which is indicated generally at 300. With additional reference to FIG. 4, concentrator machine 300, which is also referred to herein as a concentrator, includes a generally solid twin bore, conically shaped barrel 302 in which the longitudinal axes of the bore converge. Conical barrel 302 is generally solid, and is formed with a vapor discharge port 306, a feed port 308, and a concentrated solution discharge port 312. Being conically shaped, the diameter of barrel 302 is greater at a first end, indicated by EE', than at an opposite second or discharge end, indicated by GG'.

For the purpose of convenience, first end EE' shall be referred to herein as the driven end of concentrator 300, with the understanding that screws 310 may be driven from the first end or from discharge end GG'. Vapor discharge port 306 is formed in barrel 302 near driven end EE', concentrated solution discharge port 312 is formed at discharge end GG' of the barrel, and feed port 308 is formed at a location that is at about the midpoint or one-half of a total length of the barrel. A pair of conical counter-rotating, intermeshing twin screws 310 is disposed in barrel 302. Each one of twin screws includes a shaft 314 and a flight 316, which is helically wrapped about the shaft.

Twin screws 310 are driven in a rotational manner by a motor 304 that is operably connected to the screws by couplings and a gear box (not shown). Twin screws 310 typically are driven at speeds of up to 200 rotations per minute (rpm), and preferably, at speeds of up to 100 rpm. Shaft 314 of each twin screw 310 is sealed in relation to barrel 302 at each end by means known to those skilled in extruder and rotating equipment design. Preferably, the angle of shafts 314 relative to the center of conical barrel 302 is about five (5) degrees, and twin screws 310 are formed with a bore-to-root-diameter ratio of about 1.55+ 0.25/−0.10, which from about 1.45 to about 1.80.

Twin screws 310 are conical in shape and are situated within conical barrel 302 so that the outer perimeter of each flight 316 is flush with the conical barrel. Because flights 316 of twin screws 310 are flush with conical barrel 302, as the screws rotate, they self-wipe the interior surface of the barrel, which prevents polymer product from adhering to the barrel interior surface.

Each one of twin screws 310 includes two operational or functional sections, a first section 318 and a second section 322. For the sake of clarity, only one of twin screws 310 will described with the understanding that both screws share similar features. The transition between first section 318 and second section 322 of twin screw 310 is indicated by line FF', which is located between feed port 308 and discharge end GG'.

First section 318 extends from driven end EE' to transition FF'. Preferably, the length of first section 318 is about two-thirds of the total length of screw 310. The outer diameter of flights 316 in first section 318 is larger than the outer diameter of the flights in second section 322. In addition, the diameter of shaft 314 and the distance between flights 316, which is known as the pitch of the flights, are optimized for vapor removal. In this manner, the geometry of twin screw 310 in first section 318 enables flashed vapor BB' to escape through port 306. The vapor removal rate is controlled in the same manner as with flash tank 100 (FIG. 1), only it is not necessary to restrict the vapor removal to control the "bottoms" viscosity. Therefore the pressure can be controlled at a lower level, resulting in a higher concentration.

Second section 322 extends from transition FF' to discharge end GG'. Preferably, the length of second section 322 is about one-third of the total length of screw 310. The outer diameter of flights 316 in second section 322 is less than the outer diameter of the flights in first section 318. In addition, the diameter of shaft 314 and the pitch of flights 316 are optimized for positive displacement pumping of concentrated formulation of up to 98 weight percent (wt %), polymer to 10% or less solvent. In this manner, the geometry of twin screw 310 in second section 322 enables highly positive conveying with close clearances, such that there is no open path for vapor or solution to flow axially along this portion of concentrator 300. As a result, high pressures can be generated in second section 322, which supports transfer of concentrated solution CC' to downstream finishing equipment.

As mentioned above, preheated dilute BR formulation AA' is fed into concentrator 300. More particularly, formulation AA' is received in feed port 308. The internal temperature of concentrator 300 at feed port 308 is at a lower pressure than that of entering BR formulation AA', such that when the BR formulation is introduced into concentrator 300, solvent evaporates according to the resulting pressure balance. Such evaporation causes vapor, indicated by BB', to separate from BR formulation AA' in first screw section 318 and flow through the vapor space in concentrator barrel 302 to vapor discharge port 306. As BR formulation AA' is positively conveyed through conical barrel 302 by screws 310, it is concentrated up to 98 weight percent polymer to solvent, leaving a concentrated formulation, which is designated as CC'.

Discharge end GG' of concentrator 300 is sized to control the velocity of vapor BB' exiting through vapor discharge port 308. Preferably, it is desirable for vapor removal to take place so as to limit the velocity of solvent vapor BB' in concentrator 300 below a level of approximately 4 meters per second (m/sec). A velocity above this level may cause vapor BB' to entrain fine particles of polymer in the vapor stream being discharged from concentrator 300, which may foul a vapor removal conduit or a condenser (not shown) that may be located downstream of vapor discharge port 306. As a result, the velocity of vapor BB' preferably is controlled so that it is less than about 4 meters per second for larger polymers, and less than about 1 m/sec for materials which are prone to formation of small polymer fines during processing. Discharge end GG' of concentrator 300 can be made longer in order to increase the diameter of barrel 302 to handle greater volumes of vapor BB' while maintaining velocities at less than the preferred velocity of about 4 msec. In cases where it is desired to operate at lower velocities, for example at 1 msec, concentrator 300 can be lengthened further.

BR formulation AA' is positively conveyed through conical barrel 302 by screws 310, moving from first screw section 318 to second screw section 322. Formulation AA' is concentrated to as much as 98% polymer on entry into concentrator 300. The concentrated rubber is conveyed through barrel 302 and is designated as CC'. Second section 322 of screws 310 provides positive conveying, enabling positive displacement of concentrated BR formulation CC' out of concentrator 300 through concentrated solution discharge port 312. Solution discharge port 312 is sized for the appropriate volumetric displacement of concentrated polymer solution CC'. During the discharge pumping some heating of the polymer is provided by the viscous heating of screws 310, and by conduction heating of the polymer through the wall of barrel 302.

Upon discharge from solution discharge port 213, concentration formulation CC' is transferred through a pipe or other means known in the art 324 to a devolatilizing extruder 320, which is used to remove the remaining solvent from concentrated formulation CC' to a finished level, which preferably is less than about 0.03 percent (%) solvent by weight. Extruder 320 is a conventional prior art straight-walled extruder similar to extruder 30 (FIG. 1) that is described above. Alternatively, a steam stripping process or a direct drying process could be used to finish the polymer product, in which case the primary benefit of concentrator 300 is the removal of most of the solvent in a pure form, resulting in significant reduction of steam consumption.

Through the use of the above-described structural features, concentrator machine 300 and devolatilization process 200 of the present invention enable efficient and effective initial concentrations of polymer formulations to concentrations that are much higher than the prior art. Concentrator machine 300 and devolatilization process 200 of the present invention has a short residence time and the concentrator machine is a wiped device with a narrow residence time distribution. In addition, the positive conveying and devolatilization enabled by concentrator machine 300 and devolatilization process 200 of the present invention overcome the viscosity limits and metering difficulties of the prior art. Moreover, because polymer formulations can be concentrated to much higher levels during the initial removal of solvents, the energy, resources and cost needed to subsequently finish the polymer product utilizing a devolatilizing extruder, steam stripping, or direct drying process, are significantly reduced. Additionally, the overall size of concentrator 300 is much smaller compared to conventional flash tanks, thereby decreasing manufacturing space required to facilitate the devolatilization process.

Figure 4:
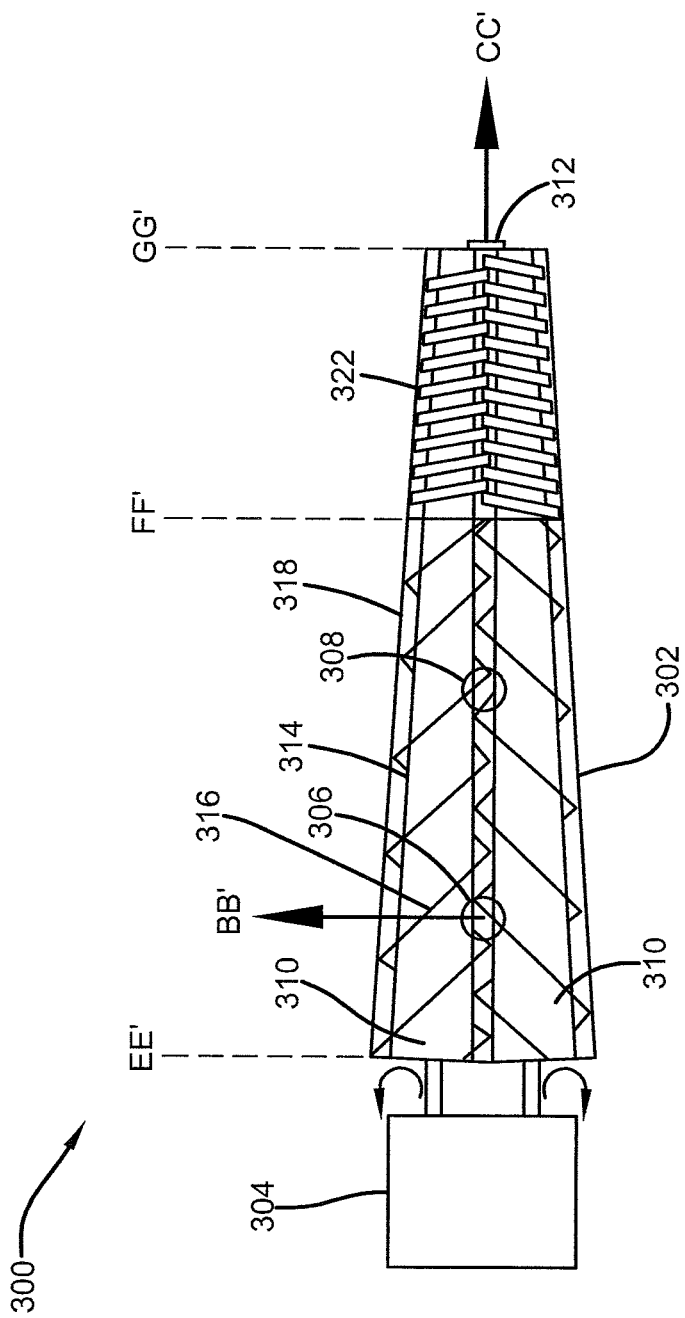
FIG. 4 is a top plan view, shown partially in cross section, of the concentrator machine shown in FIG. 3.

It is to be understood that a method of devolatilizing polymers 200 of the invention includes steps in accordance with the description that is presented above and shown in FIGS. 3 and 4.

It is also to be understood that the present invention finds application in the devolatilization of formulations with materials other than those shown and described herein and which are known to those skilled in the art, without affecting the concept or operation of the invention. For example, the invention finds application in the devolatilization of materials other than those described above, including acrylonitrile butadiene styrene, styrene acrilo nitrile, butadiene rubber, nitrile rubber, isoprene rubber, butyl or isobutylene-isoprene rubber, chloroprene rubber, acrylate rubbers, styrene butadiene rubber, styrene butadiene styrene rubber, styrene isoprene styrene, ethylene propylene rubber, epichlorohydrin rubber, synthetic rubber, thermoplastic elastomer, and thermoplastic rubber.

It is to be further understood that the structure of improved polymer solution concentrator machine 300 and devolatilization process 200 of the present invention may be altered or rearranged, or certain components omitted or added, without affecting the overall concept or operation of the invention. In cases where it is desired to operate at lower velocities than the 4 m/sec described above, for example at 1 m/sec, concentrator machine 300 can be lengthened and/or the diameter increased to accommodate such different vapor rates and/or vapor velocities.

Accordingly, the improved polymer solution concentrator machine and devolatilization process of the present invention is simplified, provides an effective, safe, inexpensive, and efficient structure which achieves all the enumerated objectives, provides for eliminating difficulties encountered with prior art devolatilization machines and processes, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved polymer solution concentrator machine and devolatilization process is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A concentrator machine for devolatilization of a polymer formulation, said machine comprising:
    a solid twin bore, conically-shaped barrel;
    a pair of conically-shaped, counter-rotating intermeshing screws disposed in said barrel, said screws including a portion with a vapor removal geometry and a portion with a positive displacement geometry;
    drive means coupled to said screws;
    a feed port formed in said barrel to enable said polymer formulation to be fed into said concentrator machine;
    a vapor discharge port formed in said barrel, said vapor discharge port enabling removal of vapor solvent from said polymer formulation; and
    a concentrated formulation discharge port formed in said barrel, said vapor removal geometry of said screws enabling flow of said vapor solvent through said vapor discharge port upon rotation of the screws to concentrate the polymer formulation from a value below about 40 weight percent polymer upon entry of said polymer formulation through said feed port to a value of up to about 98 weight percent polymer upon discharge of the polymer formulation through said concentrated formulation discharge port.

2. The concentrator machine of claim 1, wherein a ratio of a bore diameter to a root diameter of said screws is from about 1.45 to about 1.80.

3. The concentrator machine of claim 1, wherein said screws include an angle of about 5 degrees relative to a center of said barrel.

4. The concentrator machine of claim 1, wherein a length of said vapor removal geometry of said screws is about two-thirds of a total length of the screws.

5. The concentrator machine of claim 4, wherein a length of said positive displacement geometry of said screws is about one-third of a total length of the screws.

6. The concentrator machine of claim 1, wherein said formulation feed port is formed in said barrel at a location that is about one-half of a total length of the barrel.

7. The concentrator machine of claim 1, wherein said polymer formulation is selected from the group consisting of acrylonitrile butadiene styrene, styrene acrilo nitrile, butadiene rubber, nitrile rubber, isoprene rubber, butyl or isobutylene-isoprene rubber, chloroprene rubber, acrylate rubbers, styrene butadiene rubber, styrene butadiene styrene rubber, styrene isoprene styrene, ethylene propylene rubber, epichlorohydrin rubber, synthetic rubber, thermoplastic elastomer, and thermoplastic rubber.

8. A method of devolatilization of a polymer formulation, said method comprising the steps of:
    heating said polymer formulation with a preheater;
    providing a concentrator machine which includes a solid twin bore, conically-shaped barrel;
    disposing a pair of conically-shaped, counter-rotating intermeshing screws in said barrel, said screws including a portion with a vapor removal geometry and a portion with a positive displacement geometry;
    rotating said screws with drive means;

feeding said heated polymer formulation into a feed port formed in said barrel and into said screws; and concentrating the polymer formulation with said concentrator machine, said vapor removal geometry of the screws enabling flow of vapor solvent from said polymer formulation through a vapor discharge port formed in the barrel upon rotation of said screws to concentrate the polymer formulation from a value below about 40 weight percent upon entry of said polymer formulation through said feed port to a value of up to about 98 weight percent upon discharge of the polymer formulation through a concentrated formulation discharge port formed in said barrel.

9. The method of devolatilization of claim 8, wherein said step of heating said polymer formulation with a preheater is performed by a first preheater, and said method further includes the step of heating the polymer formulation with a second preheater between said first preheater and said concentrator machine.

10. The method of devolatilization of claim 8, further comprising the step of reducing material discharged from said concentrator machine to a value of less than 0.03 percent solvent by weight.

11. The method of devolatilization of claim 10, wherein said step of reducing is performed by a steam-stripping process.

12. The method of devolatilization of claim 10, wherein said step of reducing is performed by a direct drying process.

13. The method of devolatilization of claim 10, wherein said step of reducing is performed by a devolatilizing extruder.

14. The method of devolatilization of claim 8, wherein said polymer is selected from the group consisting of acrylonitrile butadiene styrene, styrene acrilo nitrile, butadiene rubber, nitrile rubber, isoprene rubber, butyl or isobutylene-isoprene rubber, chloroprene rubber, acrylate rubbers, styrene butadiene rubber, styrene butadiene styrene rubber, styrene isoprene styrene, ethylene propylene rubber, epichlorohydrin rubber, synthetic rubber, thermoplastic elastomer, thermoplastic rubber, and biomass materials.

15. The concentrator machine for devolatilization of a polymer formulation of claim 1, wherein said feed port is formed in said barrel at a location between said vapor discharge port and said concentrated formulation discharge port.

16. The concentrator machine for devolatilization of a polymer formulation of claim 1, wherein said concentrator machine limits the velocity of vapor solvent exiting said vapor discharge port below a level of about four meters per second (m/sec).

17. The concentrator machine for devolatilization of a polymer formulation of claim 1, wherein said concentrator machine limits the velocity of vapor solvent exiting said vapor discharge port below a level of about one meter per second (m/sec).

18. The concentrator machine for devolatilization of a polymer formulation of claim 1, wherein said polymer formulation is preheated and pressurized by one or more pre-heaters prior to entry into said feed port of said concentrator machine.

19. The concentrator machine for devolatilization of a polymer formulation of claim 18, wherein said polymer formulation is preheated to a saturation temperature.

* * * * *